US005329551A

United States Patent [19]

Wei

[11] Patent Number: 5,329,551
[45] Date of Patent: Jul. 12, 1994

[54] OVERLAPPED MULTILEVEL CODES

[75] Inventor: Lee-Fang Wei, Lincroft, N.J.

[73] Assignee: AT&T Bell Laboratories, Murray Hill, N.J.

[21] Appl. No.: 869,991

[22] Filed: Apr. 16, 1992

[51] Int. Cl.[5] .................... H04L 25/34; H04L 25/49
[52] U.S. Cl. ........................................ 375/17; 375/39; 375/94; 371/37.7; 371/37.4; 371/43
[58] Field of Search ................. 375/17, 39, 42, 94; 371/37.1, 37.4, 37.7, 43, 37.5

[56] References Cited

U.S. PATENT DOCUMENTS

| 5,113,401 | 5/1992 | Chevillat et al. | 371/43 |
| 5,115,438 | 5/1992 | Friederichs et al. | 371/43 |
| 5,115,453 | 5/1992 | Calderbank et al. | 371/43 |
| 5,168,509 | 12/1992 | Nakamura et al. | 375/39 |
| 5,233,630 | 8/1993 | Wolf | 371/43 |

FOREIGN PATENT DOCUMENTS

WO92/02092 2/1992 PCT Int'l Appl. .......... H04L 27/00

OTHER PUBLICATIONS

J. Wu and X. Zhu, "Multi-Level Multidimensional Trellis Codes," *International Symposium on Information Theory*, Abstracts of Papers, 1990, p. 110.
A. Ushirokawa and H. Matsui, "Multilevel Codes for High-Speed Voiceband Data Modem," *Proc. of IEEE Globecom* 1989, pp. 1971-1975.
G. J. Pottie and D. P. Taylor, "Multilevel Codes Based on Partitioning," *IEEE Transactions on Information Theory*, vol. 35, No. 1, Jan. 1989, pp. 87-98.
A. M. Michelson and A. H. Levesque, *Error-Control Techniques for Digital Communication*, John Wiley & Sons, 1985, Chapter 6.
S.-L. Su, J.-M. Wu and J.-Y. Lee, "A New Combination of Block Coded Modulation and Trellis Coded Modulation", *IEEE International Conf. on Communications*, ICC '91, pp. 1080-1084, 1991.
T. Kasami, T. Takata, T. Fujiwara, S. Lin, "On Multilevel Block Modulation Codes", *IEEE Transactions on Information Theory*, vol. 37, pp. 965-975, Jul. 1991.
L.-F. Wei, "Trellis-Coded Modulation with Multidimensional Constellations", *IEEE Transactions on Information Theory*, vol. IT-33, No. 4, Jul. 1987.

*Primary Examiner*—Stephen Chin
*Assistant Examiner*—Don N. Vo
*Attorney, Agent, or Firm*—Ronald D. Slusky

[57] ABSTRACT

A multilevel coded modulation scheme trellis encodes a portion of the input data and the resulting encoded stream is used to identify a particular one of a predetermined number of subsets of symbols of a predetermined signal constellation. The remaining input data is coded using a Reed-Solomon (RV) code whose output is used to select for transmission a particular symbol from the identified subset. In applications in which phase hits or other channel phenomena may cause the received signal points to be phase-rotated versions of the signal points that were transmitted, differential encoding is included in the overall coded modulation scheme. In different embodiments, the differential encoding/decoding and RV encoding/decoding are in different orders. In one such embodiment, overlapped multilevel codes are used to preserve the advantages afforded by taking a multilevel coding approach.

35 Claims, 8 Drawing Sheets

OVERLAPPED MULTILEVEL CODES

BACKGROUND OF THE INVENTION

The present invention relates to multilevel coded modulation useful, for example, in voiceband data transmission (e.g., modem) applications.

As used herein, the term "multilevel coded modulation" refers to arrangements in which input data is divided into two or more streams which are individually encoded using respective redundancy codes. The coded outputs are then used jointly to select channel symbols from a predetermined signal constellation for transmission over a communication channel, such as a voiceband telephone channel. The principal advantage of adopting a multilevel coded modulation approach is that it provides the system designer with increased flexibility in designing a coding scheme which provides desired levels of error-rate performance, or "coding gain," while meeting various constraints on code complexity and decoding delay. Illustrative articles describing multilevel codes are: A. Ushirokawa et al, "Multilevel Codes for High-Speed Voiceband Data Modem," *Proc. of IEEE Globecom* 1989, pp. 1971–5; J. Wu et al, "Multi-Level Multidimensional Trellis Codes," *International Symposium of Information Theory, Abstracts of Papers*, sponsored by IEEE Information Theory Society, 1990, p. 110; and Pottie et al, "Multilevel Codes Based on Partitioning," *IEEE Transactions on Information Theory*, Vol. 35, No. 1, January, 1989.

SUMMARY OF THE INVENTION

In accordance with the present invention, I have discovered a new class of codes which I refer to as overlapped multilevel codes. Such codes are characterized in that a portion of the data to be encoded is processed by a first redundancy code of the multilevel structure, at least a portion of whose output together with at least another portion of the data to be encoded is processed by a second redundancy code. Among the advantages of this approach are that it allows one to introduce differential encoding in an advantageous way into a multilevel coded modulation scheme.

DETAILED DESCRIPTION

Figure 1:
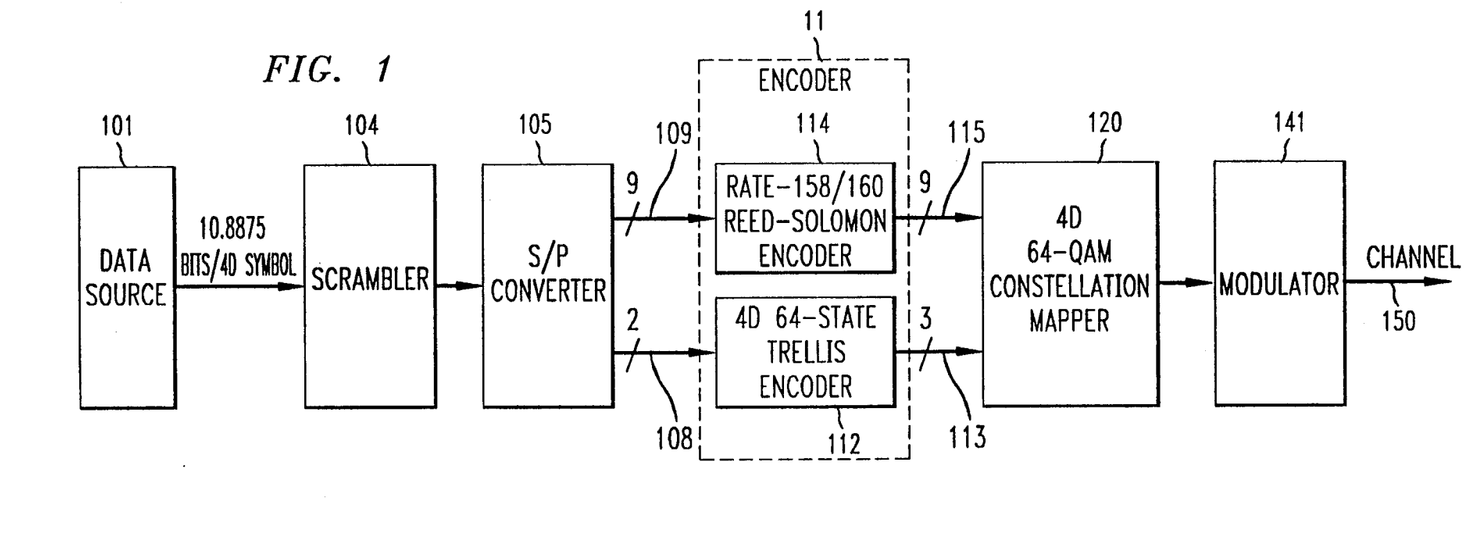
FIG. 1 is a block diagram of the transmitter portion of a telephone voiceband modem utilizing a multilevel coded modulation scheme.

FIG. 1 is a block diagram of the transmitter portion of a telephone voiceband modem utilizing a multilevel coded modulation scheme of the type taught in my co-pending U.S. patent application, Ser. No. 07/869,985, now U.S. Pat. No. 5,258,987 issued Nov. 2, 1993 entitled "Multilevel Coding Using Trellis-Coded Modulation and Reed-Solomon Codes," filed of even date herewith, assigned to the same assignee and hereby incorporated by reference. In overall view, binary data from a data source 101—such as a personal computer—is caused to be represented by 2N-dimensional symbols taken from a predetermined 2N-dimensional signal constellation, which symbols are modulated onto a carrier for transmission over a voiceband telephone channel 150.

Figure 3:
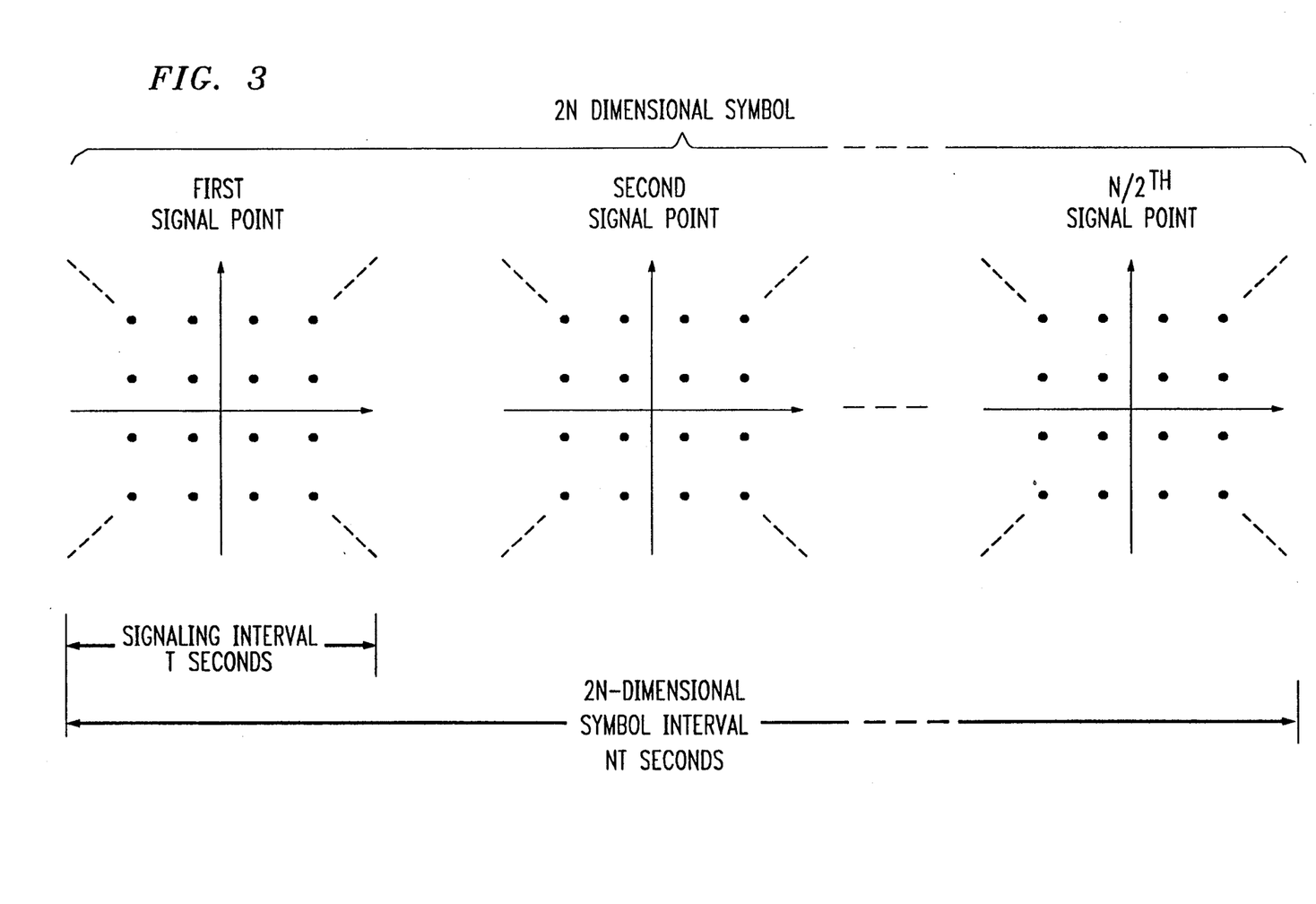
FIG. 3 is chart helpful in understanding some conventional terminology and concepts.

Attention is directed briefly to FIG. 3, which will be helpful in understanding some of the terminology and concepts that are conventionally used in this art. Each of the aforementioned symbols is comprised of the concatenation of N constituent two-dimensional (2 D) "signal points," N=1, 2, 3, .... Each such signal point is a point in a predetermined 2 D constellation—illustratively shown in FIG. 3 as a so-called QAM constellation. (The number of signal points in the 2 D constellation depends on the needs of the application.) A 2N-dimensional symbol is delivered to the transmission channel during N "signaling intervals" of duration T, one signal point in each signaling interval. The assemblage of all the different 2N-dimensional symbols used in any particular coded modulation scheme is referred to as the "2N-dimensional constellation."

Figure 4:
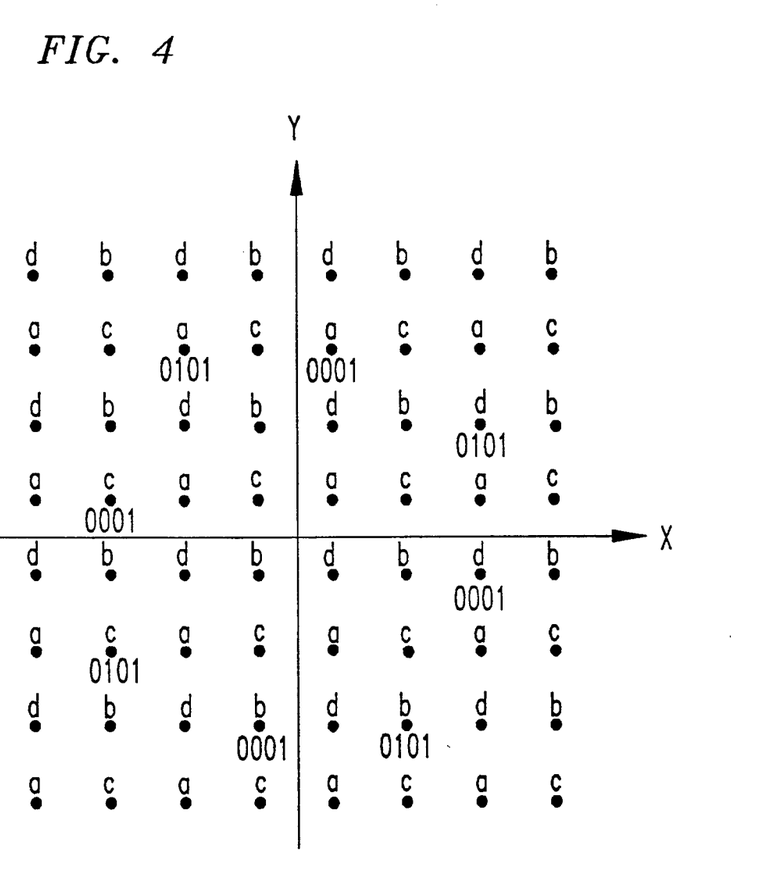
FIG. 4 shows a two-dimensional constellation that may be used in the transmitter of FIG. 1 either by itself or as a constituent of a higher dimensionality, e.g., four-dimensional constellation.

In the illustrative embodiment of FIG. 1, the value of N is 2. That is, the signal constellation is a four-dimensional (4 D) constellation comprised of symbols taken from first and second 2 D signal constellations in the first and second signaling intervals of each 4 D symbol interval, respectively. Illustratively, the same 2 D constellation is used for both signaling intervals. That 2 D constellation, in particular, is illustratively the 64-signal-point (64-point) QAM constellation shown in FIG. 4. Additionally, all possible combinations of two 2 D signal points are used in this embodiment, so that the 4 D constellation is comprised of $64^2 = 4096$ 4 D symbols.

Returning now to FIG. 1, the stream of bits from source 101 is clocked into scrambler 104 at an average rate of 10.8875 bits per 4 D symbol interval. (The significance of this rate will be made clear hereinbelow.) Scrambler 104 randomizes the data in conventional fashion. The serial bit stream output of scrambler 104 is applied to serial-to-parallel (S/P) converter 105, which provides 11-bit output words on leads 108/109 for each 4 D symbol interval. (As will be clear from the context, various ones of the leads shown and described herein, such as lead 108 or lead 109, will be understood as being, in actuality, a bundle of leads, each of which carries a respective bit.) In particular, two of the bits are provided on lead 108 and the other nine are provided on lead 109. As will be described in detail hereinbelow, S/P converter 105 occasionally will provide only the two bits on lead 108 without providing any bits on lead 109.

Figure 5:
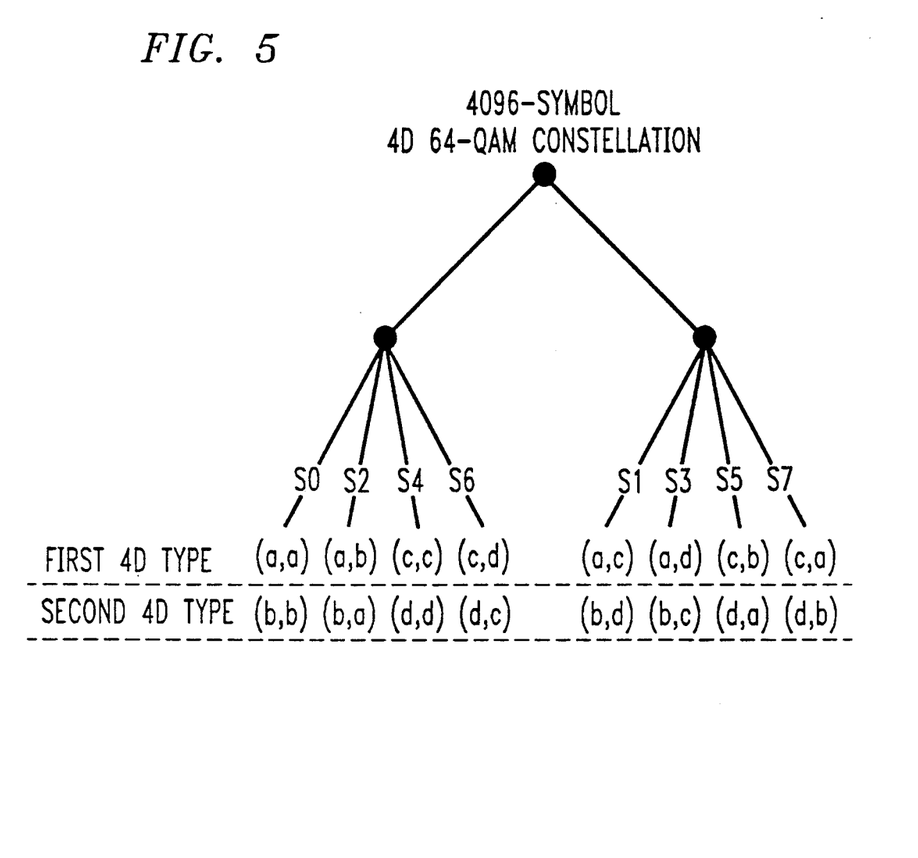
FIG. 5 shows how a four-dimensional constellation used in the illustrative embodiment is partitioned into eight subsets.

The bits on leads 108/109 are applied to an encoder 11 comprised of 4 D, 64-state trellis encoder 112 and rate-158/160 Reed-Solomon (hereinafter RV) encoder 114. In particular, the successive bit pairs on lead 108 are supplied to trellis encoder 112, whose output on lead 113 comprises three bits. These three bits identify one of eight predetermined subsets of the 4096 4 D symbols of the 4 D constellation. The symbols are assigned to subsets in the following, standard way: Each of the two 2 D constituent constellations (FIG. 4) of the overall 4 D constellation is partitioned into four 2 D subsets—denoted a, b, c, and d. FIG. 3 shows by a reference letter which of the four 2 D subsets each of the 2 D points is assigned to. The eight subsets of the overall 4 D constellation are then arrived at as shown in FIG. 5. In particular, 4 D subset S0 is comprised of each 4 D symbol in which the first and second constituent 2 D signal points are both taken from either 2 D subset a or 2 D subset b. These combinations of signal points are denoted in FIG. 5 by (a,a) and (b,b), each of which is referred to as a "4 D type." Each of the other 4 D subsets, S1 through S7, is also formed by combining 2 D subsets, as indicated in the FIG. Thus, as another example, 4 D subset S3 is comprised of each 4 D symbol in which the first and second constituent 2 D signal points are taken from 2 D subsets a and d, respectively—the 4 D type labeled (a,d)—or from 2 D subsets b and c, respectively—the 4 D type labeled (b,c). Since there are 4096 4 D symbols overall and 8 subsets, each 4 D subset contains 512 4 D symbols.

Figure 7:
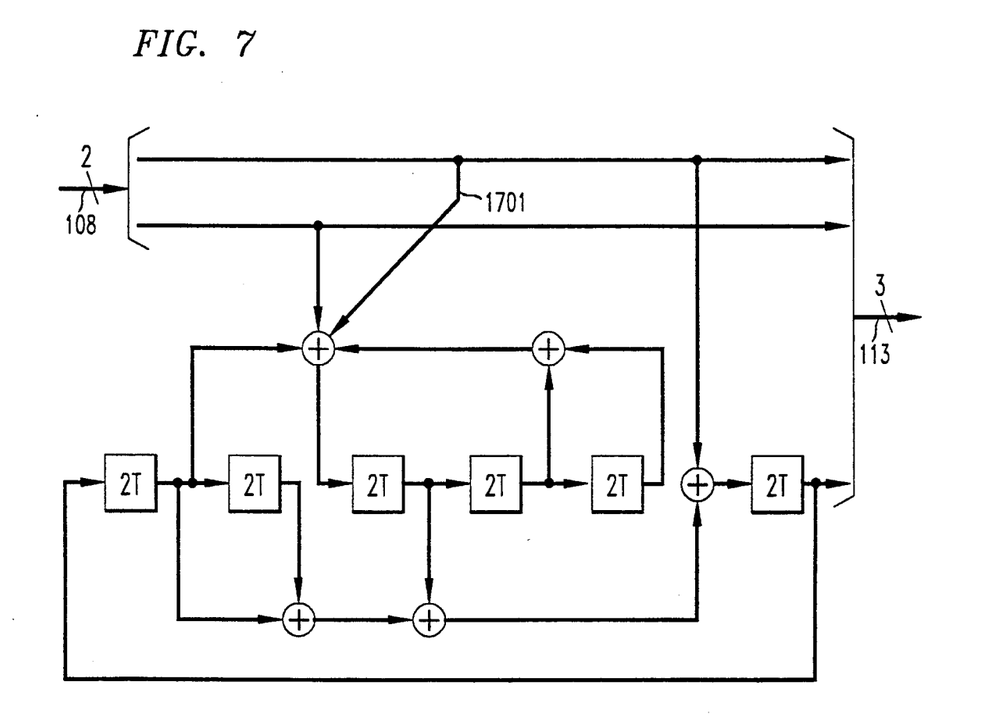
FIG. 7 shows circuitry which implements a particular trellis code used by the trellis encoder of the transmitter of FIG. 1.

Circuitry implementing the trellis code illustratively used in this embodiment is shown in FIG. 7, wherein each box labeled "2T" is a delay element which provides a delay of 2T seconds and each "+" denotes an exclusive-OR gate.

In conventional trellis-coded modulation (TCM) schemes, the bits provided on lead 109 are so-called "uncoded" bits which are used to select for transmission a particular symbol from the 4 D subset identified by the bits on lead 113. Thus in a conventional TCM scheme, each nine-bit word on lead 109 would be used to select one of the $2^9=512$ 4 D symbols of the identified 4 D subset. However, the bits on lead 109 are not used to select a symbol directly. Rather, they are first encoded by a second encoder and it is the output of that second encoder that is used to select a particular symbol from the identified subset. The overall coding scheme, then, is a "multilevel coded modulation" scheme in that there are multiple—in this case, two—levels of input bits being encoded. Specifically, some of the bits are trellis-encoded and the rest—the so-called "non-trellis-encoded" bits—are, in this embodiment, Reed-Solomon (RV) encoded by RV encoder 114. The specific combination of a trellis encoder and a RV encoder to implement a multilevel coded modulation scheme is taught in my aforementioned co-pending U.S. patent application.

Figure 6:
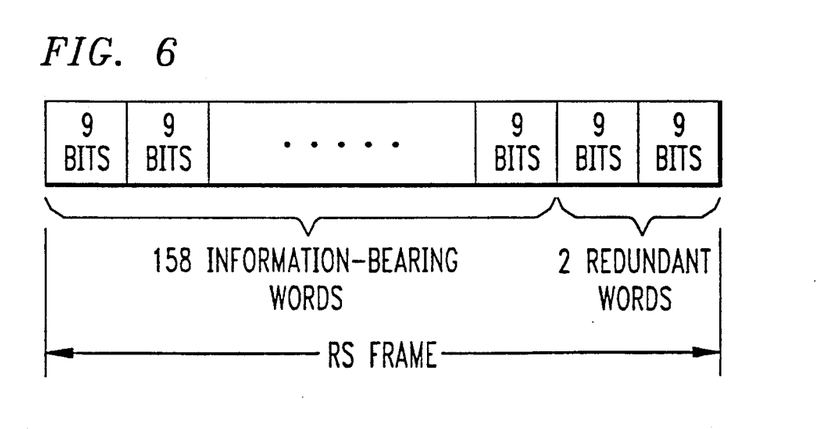
FIG. 6 shows the frame organization used for the Reed-Solomon encoder of the transmitter of FIG. 1.

RS encoder 114 is of a known type—illustratively, a conventional, rate-k/k+2 systematic encoder over $GF(2^9)$ with k=158. Reed Solomon coding and decoding is described, for example, in Michelson et al, *Error Control Techniques for Digital Communication*, Chapter 6, John Wiley and Sons, 1985. As such, encoder 114 provides its outputs in RV frames. As shown in FIG. 6, each RV frame is comprised of 160 (i.e., k+2) nine-bit RV words on lead 115. Since the RV code is a so-called systematic code, the first k=158 words of the frame are simply 158 successive input words from lead 109. These are referred to herein as the "information-bearing words." The last two words of the 160-word frame are so-called "redundant words" generated in response to the values of the first 158 words in accordance with the selected RV code. When the overall frame of 160 words in accordance with the selected RV code. When the overall frame of 160 words is first recovered in the receiver, the presence of these two redundant words therein makes possible the identification and correction of any single, erroneously recovered one or two erased ones of the 160 words. This particular RV code is thus referred to as a single-error-correcting RV code. The operation of RV encoder 114 is synchronized with that of S/P converter 105 in such a way that a nine-bit word is provided on lead 109 for each of the first 158 successive 4 D symbol intervals comprising a frame and no bits are provided in the remaining two 4 D symbol intervals. It is during these two intervals that encoder 114 outputs the aforementioned two redundant words.

As previously described, three bits are supplied on lead 113 for each of the 160 4 D symbol intervals. Twelve bits are thus supplied on leads 113 and 115 for each 4 D symbol interval—three of the bits (lead 113) identifying a 4 D subset and the remaining nine of the bits (lead 115) selecting a particular symbol of that subset. Those bits are provided to 4 D, 64-QAM constellation mapper 120, which outputs representations (e.g., the x and y coordinates) of the two constituent 2 D signal points of the selected 4 D symbol. Those representations are applied to conventional modulator 141, which applies to channel 150 a data-bearing passband signal representing those 2 D signal points.

It can now be seen why it is that data source 101 is clocked so as to supply its data at the average rate of 10.8875 bits per 4 D symbol interval, as noted above. Of the twelve bits needed to select a particular one of the 4096 4 D symbols of the constellation, one redundant bit is introduced by the trellis encoder and an average of 0.1125 (=9 bits×2/160) bits, i.e., the bits of the two redundant words, are introduced by the RV encoder. As a result, the data rate for source 101 needs to be (12−1−0.1125)=10.8875 bits per 4 D symbol interval.

Figure 2:
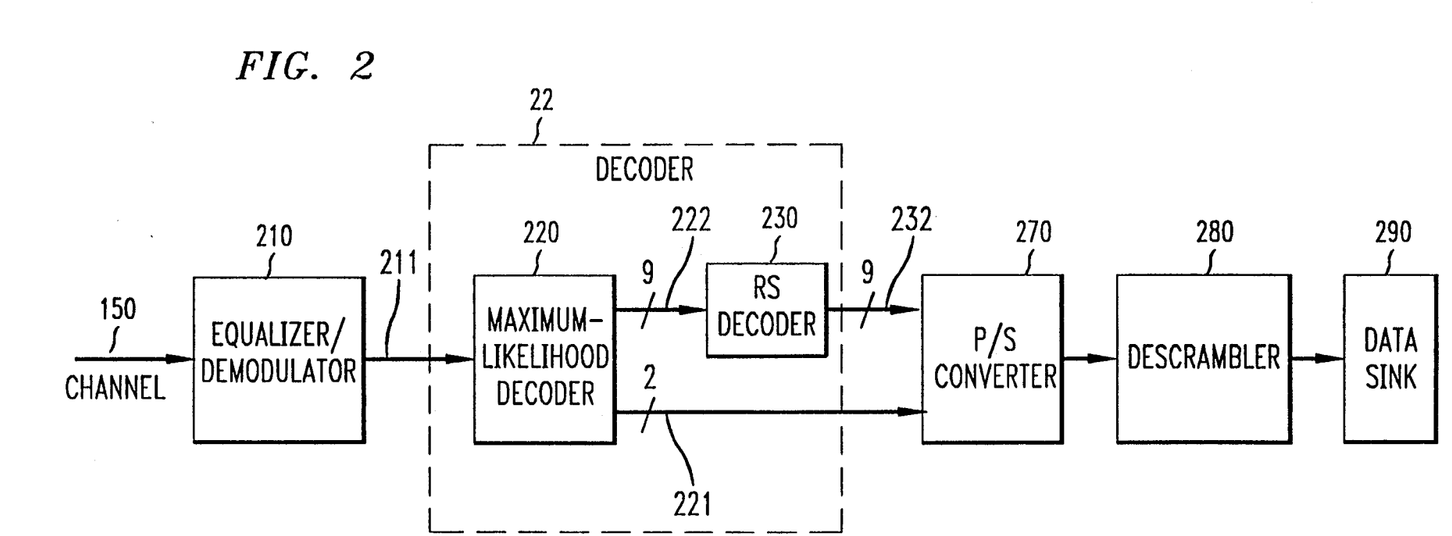
FIG. 2 is a block diagram of the receiver portion of a telephone voiceband modem capable of receiving and processing the data signals generated by the transmitter of FIG. 1.

We turn, now, to the receiver of FIG. 2.

The receiver receives from channel 150 the passband data signal generated by the transmitter of FIG. 1. The signal is first applied to equalizer/demodulator circuitry 210 which, in conventional fashion, recovers a sequence of signal points which it provides on lead 211 to decoder 22 and, more particularly, to maximum-likelihood decoder 220 therein. Because of distortion and other channel anomalies that circuitry 210 is not able to fully compensate for, the signal points on lead 211 are somewhat displaced in 2 D signal space from the 2 D signal points that were transmitted. As its name implies, the function of maximum-likelihood decoder 220 is a) to determine—based on a knowledge of the trellis code used by trellis encoder 112—what the most likely sequence of transmitted 4 D symbols actually was, and b) to provide on leads 221 and 222 eleven bits corresponding to those 4 D symbols, i.e., corresponding respectively to the bits on leads 108 and 115 in the transmitter.

The remainder of the processing performed in the receiver of FIG. 2 is the inverse of processing performed in the transmitter. Thus, in particular, RV decoder 230 within decoder 22 operates on each received frame of 160 nine-bit words on lead 222 to recover the 158 information-bearing nine-bit words therein. In particular, as noted above, the decoder is capable of identifying and correcting any error-corrupted single nine-bit word or two erased words provided by maximum-likelihood decoder 220. The stream of 158 corrected information-bearing words is supplied by RV decoder 230 on lead 232. The eleven bits on leads 221 and 232 are thereafter converted to serial form by parallel-to-serial converter 270, descrambled by descrambler 280, and applied to a data sink 290 which may be, for example, a mainframe computer.

To this point, it has been assumed that no differential encoding is performed within the transmission system. In actuality, however, this is of crucial importance for many applications, including telephone voiceband data transmission. As is about to be explained, however, the inclusion of differential encoding in multilevel coded modulation scheme cannot always be carried out in the straightforward manner taught by the prior art.

To begin, it will be remembered that differential encoding is needed in voiceband data transmission and other systems in order to compensate for the fact that so-called phase hits or other channel phenomena may cause the received signal points, as represented at the output of equalizer/demodulator 210, to be phase-rotated versions of the signal points that were transmitted. Since the constellations that are typically used in practice exhibit phase symmetries, it would be possible for the receiver circuitry to mistake a transmitted signal point for a different signal point of the constellation without any indication that an error was made. For example, in the 2 D constellation of FIG. 4, a point rotated by any multiple of 90 degrees becomes another point of the constellation (as opposed to falling within the "spaces" between points). The constellation is thus said to have 90-degree phase symmetry. Similarly, a constellation which exhibits this property only upon a 180-degree rotation is said to have 180-degree phase symmetry. In order to compensate for such rotation, it is well known to use so-called differential encoding in order to represent one or more of the data bits to be transmitted not by particular symbols, but by the phase difference between two successively transmitted symbols.

In order for differential encoding to be implemented in a system which uses trellis-coded modulation, a particular criterion must be met. That criterion is that the selected trellis code must exhibit the property that a valid sequence of subsets, after rotation by an amount corresponding to a phase symmetry of the constellation, e.g., 90 degrees, becomes another valid sequence of subsets. (As noted earlier, a "valid" sequence of subsets is one that is allowed by the trellis code to actually occur.) Moreover, in the design of the differential encoder, one must consider the effects that different partitionings may have on the rotation of a subset. There are, in fact, three possible cases, referred to herein as "case 1," "case 2" and "case 3."

In case 1, the symbols of a subset of the constellation always become symbols of a different subset after rotation by an amount corresponding to any phase symmetry of the constellation.

In case 2, the symbols of a subset of the constellation always become symbols of the same subset after rotation by an amount corresponding to any phase symmetry of the constellation.

Case 3 is a combination of cases 1 and 2. That is, the symbols of a subset of the constellation become a) symbols of a different subset after rotation by amounts corresponding to at least one phase symmetry of the constellation, and b) symbols of the same subset after rotation by amounts corresponding to at least one other phase symmetry of the constellation. Thus in the above-described 4 D code, subset S0 becomes a) subset S4 for 90- or 270-degree rotations, and b) remains what it was upon a 180-degree rotation.

Consider, now, how these requirements affect the implementation of a multilevel code.

Figure 8:
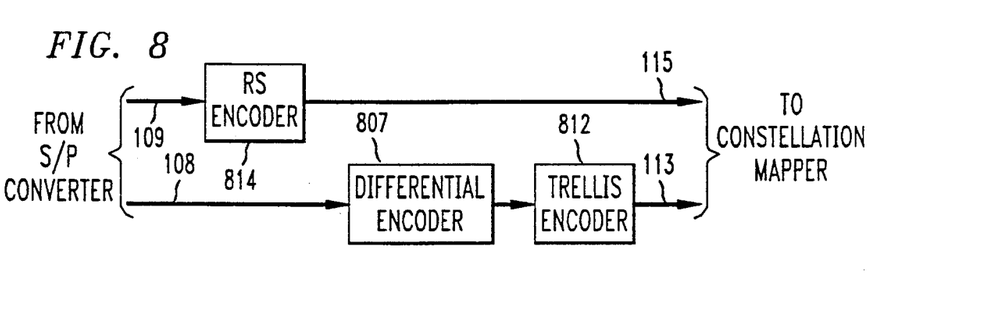
FIGS. 8–10 show possible embodiments of the encoder of FIG. 1 implementing differential encoding approaches of the prior art.

If the symmetries and partitioning of the constellation are such that case 1 obtains, it is appropriate to adopt a differential encoding approach such as used in the prior art. Specifically, one differentially encodes one or more of the trellis-encoded bits, but not any of the non-trellis-encoded bits. FIG. 8 shows an embodiment of encoder 11 implementing such an arrangement. The non-trellis-encoded bits are encoded only by a RV encoder 814, while the trellis-encoded bits are differentially encoded by differential encoder 807 before being trellis-encoded by trellis encoder 812. As is well-known by those skilled in the art, a differential encoder typically operates on a subset—typically one or two—of the bits that are applied in parallel to it, with the other bits simply being passed through the differential encoder unchanged.

A complementary decoding structure (not shown) would be used to implement decoder 22 in the receiver.

Figure 9:
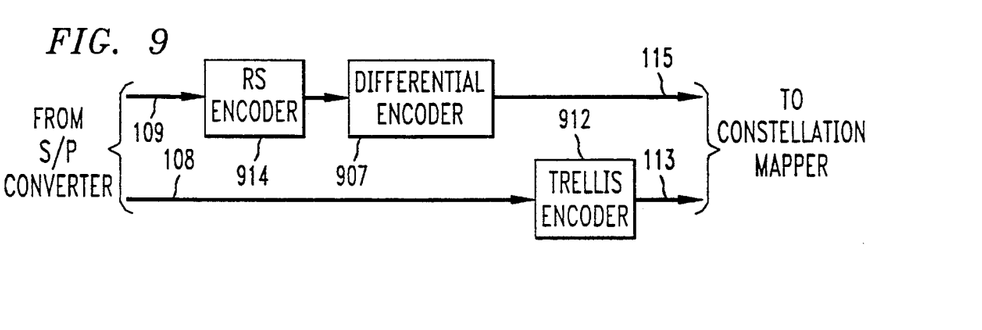

If the symmetries and partitioning of the constellation are such that case 2 obtains, it is again appropriate to adopt a differential encoding approach such as used in the prior art. Here one differentially encodes one or more of the non-trellis-encoded bits, but not any of the trellis-encoded bits. FIG. 9 shows an embodiment of encoder 11 implementing such an arrangement. The trellis-encoded bits are encoded only by trellis encoder 912, while the non-trellis-encoded bits are differentially encoded by differential encoder 907 after being encoded by RV encoder 914. (Again, complementary decoding structure (not shown) would be used to implement decoder 22 in the receiver.) It may also be noted in passing that the way in which the differential decoder works means that the error correction capability of the RV code will have to be increased in this case in order to achieve the same performance as would be achieved if the phase-rotation issue and the differential decoder were not there.

Case 3 requires that both trellis-encoded and non-trellis-encoded bits be differentially encoded. This presents a significant problem—a problem that is solved in accordance with a feature of the invention. That problem may be understood as follows:

As exemplified by FIG. 9, it is desirable, in general, that if any of the RV-encoded bits are to be differentially encoded, that encoding should be performed after the RV encoding in the transmitter. Complementarily, the differential decoding should be performed in the receiver before the RV decoding. The reason for this is that a conventional RV decoder is not, in general, capable of carrying out its function properly if the non-trellis-encoded bits have been changed as the result of phase rotations. By performing the differential decoding in the receiver prior to the RV decoding, then, it is guaranteed that there will be no phase-rotation effects in the RV decoder input bits (assuming an appropriate choice for the trellis encoder).

Figure 10:
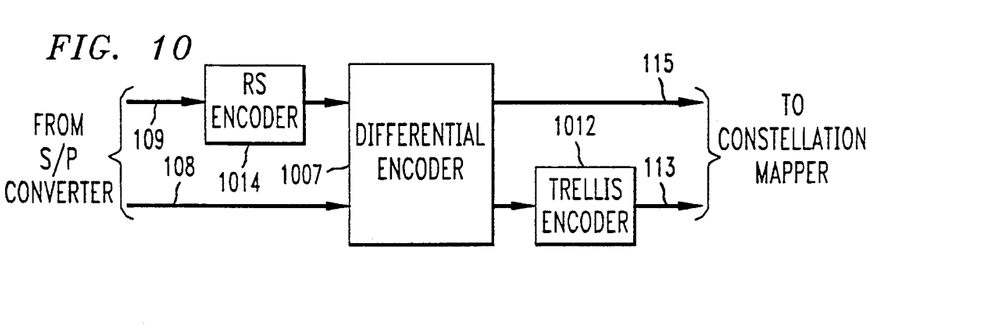

Although this approach will, indeed, be effective if only non-trellis-encoded bits are differentially encoded—which, again, is the situation shown in FIG. 9, corresponding to case 2—I have realized that there is a subtle, but very important, problem whenever the bits to be differentially encoded include not only non-trellis-encoded bits, but also trellis-encoded bits, i.e., case 3. The reason is that those bits must be processed interdependently in both the differential encoder and the differential decoder. A structure of encoder 11 that one might think of using for this case is shown in FIG. 10, wherein the RV-encoded bits generated by RV encoder 1014 are differentially encoded interdependently with the trellis-encoded bits by differential encoder 1017, the resulting differentially encoded trellis-encoded bits thereupon being extended to trellis encoder 1012. The complementary structure that would be used for decoder 22 is shown in FIG. 12 as comprising maximum-likelihood decoder 1220, differential decoder 1207 and RV decoder 1230.

Figure 12:
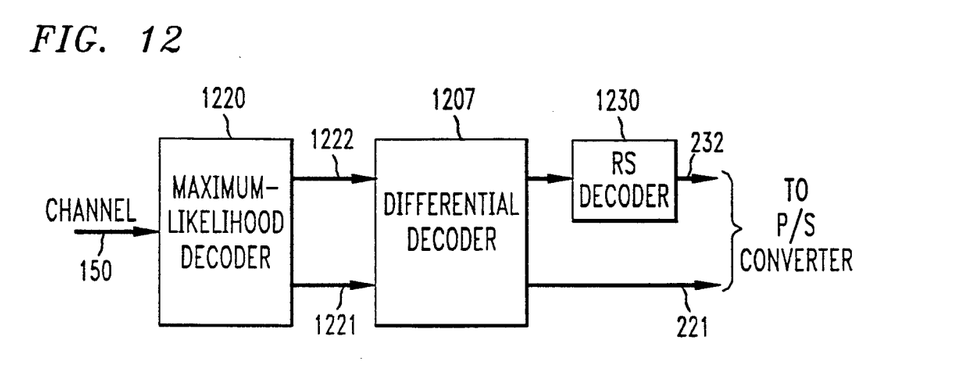
FIG. 12 shows an embodiment for the decoder used in the receiver of FIG. 2 which would be used in conjunction with the prior art encoder of FIG. 10.

The encoder/decoder combination of FIGS. 10 and 12 will, indeed, be effective as regards the compensation for phase rotations. What I have appreciated, however, is that with this interdependent processing, errors made by the maximum-likelihood decoder in the non-trellis-encoded bits before they are processed by the RV decoder will cause errors in the trellis-encoded bits at the output of the differential decoder. Thus the error-rate performance of the non-trellis-encoded bits output on lead 1222 of maximum-likelihood decoder 1220, i.e., at a point prior to their being RV decoded by RV decoder 1230, will determine the error-rate performance of the trellis-encoded bits which, in turn, determines the overall error-rate performance (coding gain). Remember that the reason that the RV encoding was included in the overall coding scheme was to raise the error-rate performance of the non-trellis-encoded bits to a level that is greater than that for the trellis-encoded bits so that the latter can dominate the overall error-rate performance. Now, however, the error-rate performance of the trellis-encoded bits has been brought down to the level of performance for the non-trellis-encoded bits that obtained in the first instance, i.e., without using the RV code. The fact that the error-rate performance of the non-trellis-encoded bits is thereafter improved by virtue of their being processed by RV decoder 1230 is of no avail. Thus, no improvement in overall error-rate performance is realized.

In accordance with the invention, this problem is overcome by processing the bits in such a way that differentially encoded bits that are to be trellis encoded are derived from the output of the RV encoder. In this sense, the RV and trellis codes are "overlapped," hence my coining of the term "overlapped multilevel codes." Experimental tests have confirmed that the error-rate performance (coding gain) for the overall overlapped multilevel code is, as a result, restored to the original level provided by the trellis code. Thus looking specifically at FIG. 11, it is seen that one of the bits on lead 108 that would normally be applied to differential encoder 1107 prior to being applied to trellis encoder 1112 is instead applied to RV encoder 1114 (on lead 1121) along with the non-trellis-encoded bits on lead 109. We have here case 3 discussed above, in which the bits to be differentially encoded are both trellis- and non-trellis-encoded bits. Thus the bit on lead 1121, after being RV encoded by encoder 1114, is applied to differential encoder 1107 along with one or more of the other RV encoder output bits. The differentially encoded trellis-encoded bit is thereupon provided on lead 1110 to trellis encoder 112 along with the other trellis-encoded bit on lead 1111.

Figure 11:
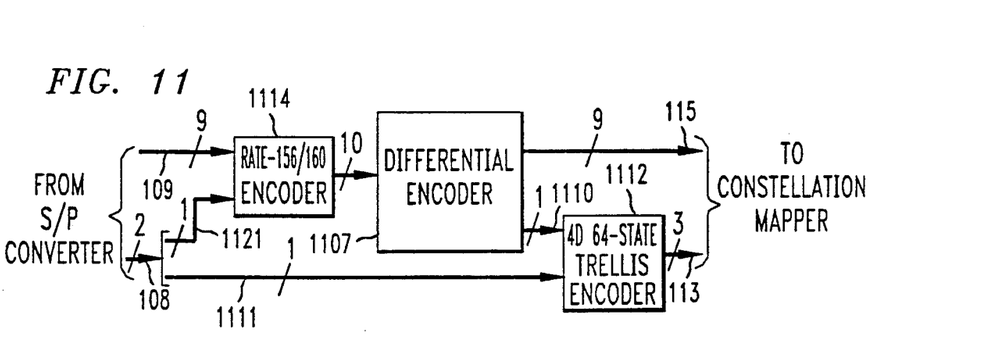
FIG. 11 shows an embodiment for the encoder of FIG. 1 embodying the principles of the present invention.

In the implementation of the structure of FIG. 11, various characteristics and operating parameters will be different from those assumed above. For example, the number of bits in each RV word is now 10, rather than 9. Moreover, a double-rather than a single-error-correcting RV code is now needed because the differential decoder output is formed by finding the "difference" between successive pairs of ten-bit words applied to it. Thus a single erroneous word at the input of the differential decoder causes two erroneous words at its output. In light of the foregoing, then, an illustrative code for use in RV encoder 1114 is a rate-k/k+4 systematic encoder over $GF(2^{10})$ with k=156. Moreover, the operation of RV encoder 1114 is synchronized with that of S/P converter 105 in such a way that a nine-bit (two-bit) word is provided on lead 109 (108) for each of the first 156 successive 4 D symbol intervals comprising a frame and no bits (one bit) are provided in the remaining four 4 D symbol intervals. It is during these four intervals that encoder 114 outputs the aforementioned four redundant words. Furthermore, because there are now four redundant words per frame rather than two, and ten bits per RV word rather than nine, a simple calculation will show that the stream of bits from source 101 should now be clocked into scrambler 104 at an average rate of 10.75 bits per 4 D symbol interval.

More generally speaking, an overlapped multilevel code is one in which a portion of the data to be encoded is processed by a first redundancy code of the multilevel structure. A portion of the output of this first encoder together with another portion of the data to be encoded is then processed by a second redundancy code.

One may also describe the structure of FIG. 11, and the processing performed thereby, by observing that a first portion of the input data (on leads 109 and 1121) is encoded using at least a first redundancy code (implemented by RV encoder 1114) and, in this embodiment, using differential encoding (implemented by differential encoder 1107) as well. A first encoded signal, comprising the differential encoder output (on leads 1110 and 115) is thus provided. At the same time, a second portion of the input data (on lead 1111) is encoded along with a first portion of the first encoded signal (lead 1110) using a second redundancy code (implemented by trellis encoder 1112) to provide a second encoded signal (on lead 113).

Figure 13:
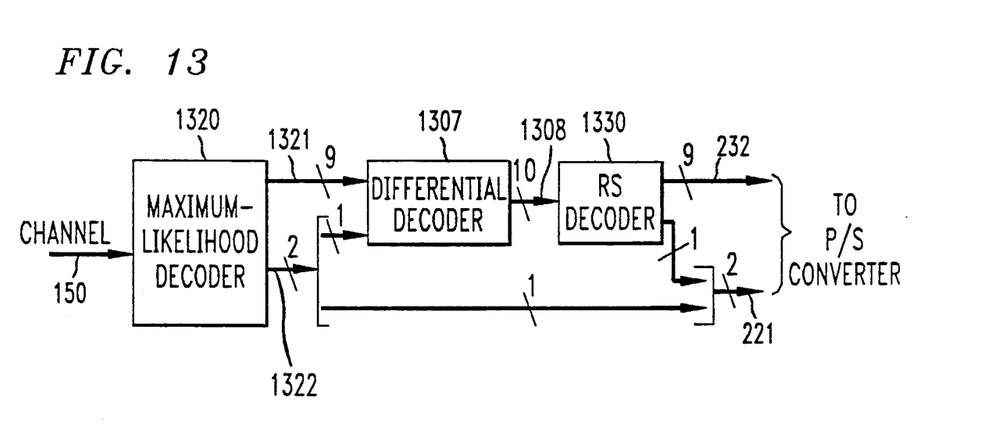
FIG. 13 shows an embodiment for the decoder of FIG. 2 embodying the principles of the present invention.

Complementary processing is carried out in the receiver. Thus, as shown in FIG. 13, the non-trellis-encoded bits that are output by maximum-likelihood decoder 1320 on lead 1321 are applied to differential decoder 1307. Of the two trellis-encoded bits provided by maximum-likelihood decoder 1320 on lead 1322, one is provided to differential decoder 1307 while the other is supplied directly onto lead 221. The output bits of differential decoder 1307 on lead 1308 are RV-decoded by RV decoder 1330. One output bit of the latter, corresponding to the bit on lead 1121, is supplied to lead 221. The remainder are supplied to lead 232.

The foregoing merely illustrates the principles of the present invention. For example, the invention is illustrated herein in the context of a particular multilevel coded modulation scheme comprised, specifically, of two levels of coding. However, it may also be used in schemes in which there are three or more levels of coding, in which case the overlapping taught by the invention might still be limited to only two of the levels or might extend over more than two levels. Moreover, the invention is not limited to use with any particular type of redundancy codes—such as the trellis or RV codes of the illustrative embodiment—nor to any particular constellations, etc.

Moreover, although the disclosure hereof shows how overlapped multilevel coding pursuant to the invention may be used to particular advantage in multilevel coded modulation environments in which it is desired to include differential encoding/decoding, those in the art may find reasons to use overlapped multilevel codes in environments which do not require differential encoding/decoding.

Additionally, it may be noted that, although the invention is illustrated herein as being implemented with discrete functional building blocks, e.g., encoders, mappers, etc., the functions of any one or more of those building blocks can be carried out using one or more appropriately programmed processors, digital signal processing (DSP) chips, etc. Thus although each of the various "means" recited in the claims hereof may correspond, in some embodiments, to specific circuitry which is specifically designed to perform the function of just that means, it will be appreciated that such "means" may alternatively correspond, in other embodiments, to the combination of processor-based circuitry with stored program instructions which cause that circuitry to perform the function in question.

It will thus be appreciated that those skilled in the art will be able to devise numerous and various alternative arrangements which, although not explicitly shown or described herein, embody the principles of the invention and are within its spirit and scope.

I claim:

1. A method for encoding input data comprising the steps of
   encoding a first portion of said input data at least using a first redundancy code to provide a first encoded signal having at least a first portion, and
   encoding a second portion of said input data along with said first portion of said first encoded signal using a second redundancy code to provide a second encoded signal.

2. The invention of claim 1 comprising the further steps of
   generating a signal representing at least said second encoded signal, and applying said signal to a communication channel.

3. The invention of claim 2 wherein said generating step comprises the step of
   generating a sequence of channel symbols selected from a predetermined signal constellation.

4. A method for encoding input data comprising the steps of
   encoding a first portion of said input data at least using a first redundancy code to provide a first encoded signal having at least first and second portions, and
   encoding a second portion of said input data along with said first, but not said second, portion of said first encoded signal using a second redundancy code to provide a second encoded signal.

5. The invention of claim 4 comprising the further steps of
   generating a signal representing said second encoded signal and said second portion of said first encoded signal, and
   applying said signal to a communication channel.

6. The invention of claim 5 wherein said generating step comprises the step of
   selecting a sequence of channel symbols from a predetermined signal constellation.

7. The invention of claim 4 wherein the step of encoding a first portion of said input data includes the steps of
   encoding said first portion of said input data using said first redundancy code, and
   differentially encoding the data encoded using said first redundancy code, first and second portions of the differentially encoded data being included in said first and second portions of said first encoded signal, respectively.

8. The invention of claim 7 wherein said second redundancy code is a trellis code.

9. The invention of claim 8 wherein said signal constellation is comprised of a plurality of subsets of channel symbols, and wherein said selecting step includes the steps of
   identifying a sequence of said subsets in response to said second encoded signal, and
   selecting a channel symbol from each subject of said sequence in response to said second portion of said first encoded signal.

10. The invention of claim 9 wherein said first redundancy code is a Reed-Solomon code.

11. A method for processing a data-bearing signal received from a communication channel, said received data-bearing signal being of a type generated by the steps of encoding a first portion of input data at least using a first redundancy code to provide a first encoded signal having at least a first portion; encoding a second portion of said input data along with said first portion of said first encoded signal using a second redundancy code to provide a second encoded signal; and generating said data-bearing signal in response to at least said second encoded signal, said method comprising the steps of
   decoding said received data-bearing signal in accordance with said second redundancy code to recover said second portion of said input data and a signal representing said first encoded signal, and
   decoding the recovered signal representing said first encoded signal in accordance with said first redundancy code to recover said first portion of said input data.

12. The invention of claim 11 wherein said second redundancy code is a trellis code and wherein the step of decoding said received data-bearing signal comprises maximum likelihood decoding.

13. The invention of claim 12 wherein said first redundancy code is a Reed-Solomon code.

14. A method for processing a data-bearing signal received from a communication channel, said data-bearing signal being of a type generated by the steps of encoding a first portion of input data using a first redundancy code to provide a first encoded signal; differentially encoding said first encoded signal to provide a differentially encoded signal having first and second portions; encoding a second portion of said input data along with said first portion of said differentially encoded signal using a second redundancy code to provide a second encoded signal; and generating said data-bearing signal in response to said second portion of said differentially encoded signal and second encoded signal, said method comprising the steps of     decoding said received data-bearing signal in accordance with said second redundancy code to recover said second portion of said input data and said differentially encoded signal,     differentially decoding the recovered differentially encoded signal to recover said first encoded signal, and     decoding the recovered first encoded signal in accordance with said first redundancy code to recover said first portion of said input data.

15. The invention of claim 14 wherein said second redundancy code is a trellis code and wherein the step of decoding said received data-bearing signal comprises maximum likelihood decoding.

16. The invention of claim 15 wherein said first redundancy code is a Reed-Solomon code.

17. A method comprising the steps of encoding a first portion of input data at least using a first redundancy code to provide a first encoded signal having at least a first portion,     encoding a second portion of said input data along with said first portion of said first encoded signal using a second redundancy code to provide a second encoded signal     communicating over a communication channel a data-bearing signal representing at least said second encoded signal,     receiving said data-bearing signal from said channel,     decoding said received data-bearing signal in accordance with said second redundancy code to recover said second portion of said input data and a signal representing said first encoded signal, and     decoding the recovered signal representing the first encoded signal in accordance with said first redundancy code to recover said first portion of said input data.

18. The invention of claim 17 wherein said second redundancy code is a trellis code and wherein the step of decoding said received data-bearing signal comprises maximum likelihood decoding.

19. The invention of claim 18 wherein said first redundancy code is a Reed-Solomon code.

20. A method comprising the steps of encoding a first portion of input data using a first redundancy code to provide a first encoded signal,     differentially encoding said first encoded signal to provide a differentially encoded signal having first and second portions,     encoding a second portion of said input data along with said first portion of said differentially encoded signal using a second redundancy code to provide a second encoded signal,     generating a data-bearing signal in response to said second portion of said differentially encoded signal and second encoded signal and applying said data-bearing signal to a communication channel,     receiving said data-bearing signal from said channel,     decoding said received data-bearing signal in accordance with said second redundancy code to recover said second portion of said input data and said differentially encoded signal,     differentially decoding the recovered differentially encoded signal to recover said first encoded signal, and     decoding the recovered first encoded signal in accordance with said first redundancy code to recover said first portion of said input data.

21. The invention of claim 20 wherein said second redundancy code is a trellis code and wherein the step of decoding said received data-bearing signal comprises maximum likelihood decoding.

22. The invention of claim 21 wherein said first redundancy code is a Reed-Solomon code.

23. Apparatus for encoding input data comprising means for encoding a first portion of said input data at least using a first redundancy code to provide a first encoded signal having at least a first portion, and     means for encoding a second portion of said input data along with said first portion of said first encoded signal using a second redundancy code to provide a second encoded signal.

24. The invention of claim 23 further comprising means for generating a signal representing at least said second encoded signal, and     means for applying said signal to a communication channel.

25. The invention of claim 24 wherein said generating means includes means for generating a sequence of channel symbols selected from a predetermined signal constellation.

26. Apparatus for encoding input data comprising means for encoding a first portion of said input data at least using a first redundancy code to provide a first encoded signal having at least first and second portions, and     means for encoding a second portion of said input data along with said first, but not said second, portion of said first encoded signal using a second redundancy code to provide a second encoded signal.

27. The invention of claim 26 further comprising means for generating a signal representing said second encoded signal and said second portion of said first encoded signal, and     means for applying said signal to a communication channel.

28. The invention of claim 27 wherein said generating means includes means for selecting a sequence of channel symbols from a predetermined signal constellation.

29. The invention of claim 26 wherein the means for encoding a first portion of said input data includes     means for encoding said first portion of said input data using said first redundancy code, and     means for differentially encoding the data encoded using said first redundancy code, first and second portions of the differentially encoded data being included in said first and second portions of said first encoded signal, respectively.

30. The invention of claim 29 wherein said second redundancy code is a trellis code.

31. The invention of claim 28 wherein said signal constellation is comprised of a plurality of subsets of channel symbols, and wherein said selecting means includes     means for identifying a sequence of said subsets in response to said second encoded signal, and     means for selecting a channel symbol from each subset of said sequence in response to said second portion of said first encoded signal.

32. The invention of claim 31 wherein said first redundancy code is a Reed-Solomon code.

33. Apparatus for processing a data-bearing signal received from a communication channel, said data-bearing signal being of a type generated by the steps of encoding a first portion of input data using a first redundancy code to provide a first encoded signal; differentially encoding said first encoded signal to provide a differentially encoded signal having first and second portions; encoding a second portion of said input data along with said first portion of said differentially encoded signal using a second redundancy code to provide a second encoded signal; and generating said data-bearing signal in response to said second portion of said differentially encoded signal and second encoded signal, said apparatus comprising means for decoding said received data-bearing signal in accordance with said second redundancy code to recover said second portion of said input data and said differentially encoded signal, means for differentially decoding the recovered differentially encoded signal to recover said first encoded signal, and means for decoding the recovered first encoded signal in accordance with said first redundancy code to recover said first portion of said input data.

34. The invention of claim 33 wherein said second redundancy code is a trellis code and wherein the means for decoding said received data-bearing signal is a maximum likelihood decoder.

35. The invention of claim 34 wherein said first redundancy code is a Reed-Solomon code.

* * * * *